July 10, 1928.
1,676,545
R. GROSS
INDUCTION FURNACE
Filed June 16, 1927
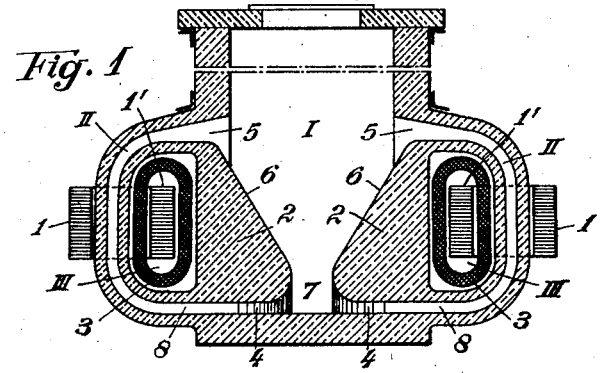
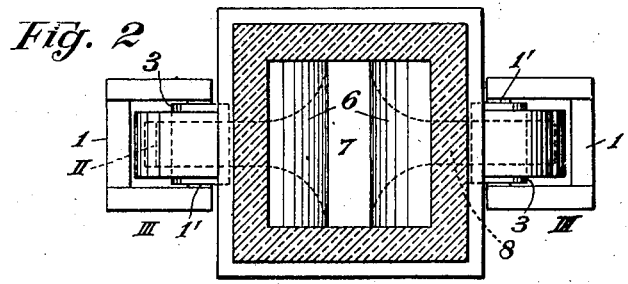
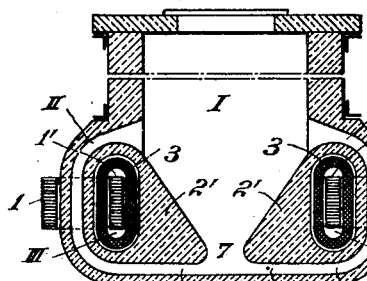 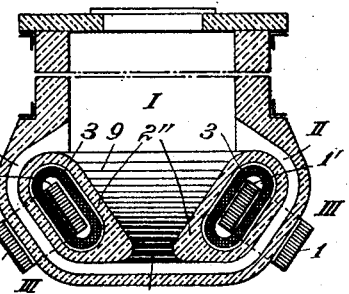
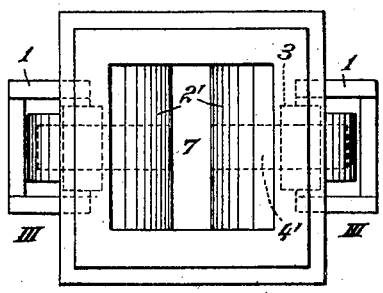 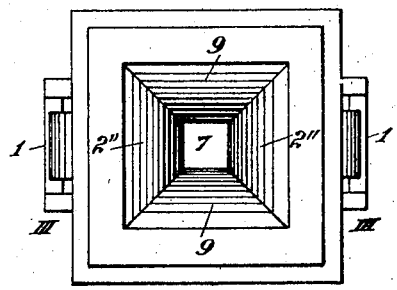
Inventor:
Reinhold Gross
by Lotka, Kehlenbeck & Farley
Attorneys.

Patented July 10, 1928.

1,676,545

UNITED STATES PATENT OFFICE.

REINHOLD GROSS, OF HOHENNEUENDORF, NEAR BERLIN, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

INDUCTION FURNACE.

Application filed June 16, 1927, Serial No. 199,204, and in Germany July 2, 1926.

My invention relates to induction furnaces of that type in which one or a plurality of closed channels in communication with a hearth are surrounded by the transformer core or a plurality of cores.

Various constructions of this type of furnace have already been proposed. The furnace designed by Schneider-Creusot, for instance, is provided with two diametrically opposite channels the points of communication of which with the hearth are located at different levels, in order to bring about a circulation of the charge within the channels. According to the suggestion by Ajex-Wyat, on the other hand, there is provided below the hearth a channel forming an acute angle, which in otherwise similar constructions is made of more rectangular or rounded shape. The circulation of the metal in the channel then takes place either purely by thermal action or by strongly increasing the current and making use of the pinch effect in tubular passages, it being then necessary to dimension the channel so, that cooler metal from the hearth flows into the channel in proportion to the metal which is projected upwards by the pinch effect.

While in the Schneider-Creusot furnace the circulation in the channels was insufficient, the full utilization of the pinch effect involves other drawbacks particularly with regard to the durability of the lining in the channels.

According to my invention these drawbacks are eliminated by connecting the channel or channels with the bottom of the hearth and with a point located vertically above it, preferably the walls of the hearth intermediate these points being so inclined that the cross-sectional area of the hearth diminishes towards the bottom of the furnace.

The vertical arrangement of the main portion of the channels results in a permanent circulation of the charge in the direction from the bottom to the top of the channels due to the varying static pressure upon the contents of the channel and the thermal action. The arrangement has under certain circumstances however the drawbacks, that the hearth located between the channels has an excessively large content which becomes heated comparatively slowly. To eliminate this drawback the walls of the hearth are given an inclination towards the bottom.

In the drawing affixed hereto three embodiments of my invention are shown by way of example.

In the drawing is:

Fig. 1, a vertical section through my improved furnace,

Fig. 2, a sectional plan of Fig. 1,

Fig. 3, a vertical section through a modification of the furnace,

Fig. 4, a plan of Fig. 3,

Fig. 5, a vertical section through a further modification, and

Fig. 6, a plan of Fig. 5.

Like parts are indicated by like numerals of reference in the various figures of the drawing.

Referring to the drawing it will be observed that from the vertical hearth I of square cross-section extend two channels II located diametrically opposite. Each of the channels passes through a transformer III consisting of a rectangular core 1 the inner limb 1' of which located between the wall of the hearth 2 and the channel carries the primary winding 3. The channels II communicate with the bottom portions 4 of the hearth I and open into the hearth at points 5 located vertically above. The opposite sides 6 of the lower furnace walls 2 converge towards the bottom and each other in such a manner, that a distribution opening 7 remains between the hearth and the lower admission openings 8 of the channels II. The openings 8 open into the lower expanded portion 4 of the hearth in such a manner that the connecting passage extends across the entire width of the hearth.

The Figs. 3 and 4 of the drawing illustrate a modified construction of my improved smelting furnace which aims at reducing the breadth of the furnace. With this end in view the inner legs 1' of the transformers III with the primary coils 3 are placed in the lower portion 2' of the wall of the furnace itself. The channels II thus become slightly shorter owing to the shortening of their horizontal branches. The lower portions 4' of the hearth I are here as narrow as the channels II and their lower openings 8, so that the connecting opening 7 is also reduced.

In the Figs. 5 and 6 there is illustrated in an otherwise similar manner to Figs. 3 and 4, a further modified furnace according to my invention in which the transformer cores 1 are arranged obliquely in such a manner that the primary coils 3 fill up the lower wall block 2'' almost completely so that a still more compact construction is attained.

As clearly shown in Fig. 6 not only the portions 2'' of the walls of the furnace adjacent to the channels converge towards the center of the furnace, but also the parts 9 at right angles to them so that the points of intersection of the wall surfaces with the sole plate of the hearth limit the width of the connecting passage of the channels II with the hearth I.

For the sake of simplicity well known details, such as the cooling arrangement for the primary winding and the like, have been omitted in the drawing.

Various changes and modifications may be made in my invention without departing from its spirit and I desire therefore, that only such limitations shall be placed thereon as are imposed by the prior art.

I claim as my invention:

1. An induction furnace comprising in combination, a hearth, a transformer core, a channel surrounded by the transformer core and communicating on the one hand with the bottom of said hearth and on the other hand with a point vertically above the bottom opening, and an inclined hearth wall between the openings of said channel whereby the cross-section of said hearth is reduced toward the bottom.

2. An induction furnace comprising in combination, a rectangular hearth, transformer cores, two diametrically opposite channels surrounded by the transformer cores in communication with the bottom of said hearth and with points vertically above the bottom openings and inwardly and downwardly converging hearth walls between the openings of said channels and adapted to leave a connecting opening between them extending across the entire depth of said hearth.

3. An induction furnace comprising in combination, a rectangular hearth, transformer cores, two diametrically opposite channels surrounded by the transformer cores in communication with the bottom of said hearth and with points vertically above the bottom openings and inwardly and downwardly extending hearth walls converging from all sides towards the center and between the openings of said channels.

4. An induction furnace comprising in combination, a rectangular hearth with walls converging towards the center, transformer cores, two diametrically opposite channels surrounded by the transformer cores and inclined substantially parallel to said walls and opening into the hearth at the bottom and top of said converging walls.

5. An induction furnace comprising in combination, a rectangular hearth with walls converging towards the center, transformer cores, two diametrically opposite channels surrounded by the transformer cores and inclined substantially parallel to said walls and opening into the hearth at the bottom and top of said converging walls, the primary windings of said transformers being housed completely within said lower inclined wall portions.

6. An induction furnace comprising in combination a hearth, a plurality of channels connected at one end to the hearth at the bottom, at the other end to points of the hearth above and in vertical registry with the corresponding bottom openings.

7. An induction furnace comprising in combination a hearth, a plurality of channels connected at one end to the hearth at the bottom, at the other end to points of the hearth above and in vertical registry with the corresponding bottom openings, a plurality of transformer cores surrounding respectively said channels.

8. An induction furnace comprising in combination a hearth, a plurality of channels connected at one end to the hearth at the bottom, at the other end to points of the hearth vertically above the corresponding bottom openings, a plurality of transformer cores surrounding respectively said channels, primary windings on said cores and arranged completely within the rooms formed by the channels and the walls of the hearth.

In testimony whereof I affix my signature.

REINHOLD GROSS.